(12) United States Patent
Tian (10) Patent No.: US 8,370,296 B2
(45) Date of Patent: *Feb. 5, 2013

(54) METHOD FOR TRANSMITTING SYNCML SYNCHRONIZATION DATA

(75) Inventor: Linyi Tian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/173,652

(22) Filed: Jun. 30, 2011

(65) Prior Publication Data

US 2011/0258450 A1   Oct. 20, 2011

Related U.S. Application Data (63) Continuation of application No. 11/610,711, filed on Dec. 14, 2006, now Pat. No. 7,996,358, which is a continuation of application No. PCT/CN2005/001548, filed on Sep. 23, 2005.

(51) Int. Cl.
*G06F 7/00* (2006.01)
*G06F 17/00* (2006.01)

(52) U.S. Cl. ............... 707/610; 707/609; 707/697

(58) Field of Classification Search .......... 370/328; 707/610, 609, 697, 999; 1/1
See application file for complete search history.

(56) References Cited

U.S. PATENT DOCUMENTS

| | | | |
|---|---|---|---|
| 6,990,583 B2 | 1/2006 | Matsuyama et al. | |
| 7,281,128 B2 | 10/2007 | Mikel et al. | |
| 2002/0081995 A1 | 6/2002 | Leppinen et al. | |
| 2003/0097433 A1 | 5/2003 | Park et al. | |
| 2003/0154298 A1 | 8/2003 | Lu | |
| 2004/0139180 A1 | 7/2004 | White et al. | |
| 2004/0151186 A1 | 8/2004 | Akama | |
| 2005/0038863 A1 | 2/2005 | Onyon et al. | |

FOREIGN PATENT DOCUMENTS

| | | |
|---|---|---|
| CN | 1305285 | 7/2001 |
| CN | 1305285 A | 7/2001 |
| CN | 1753359 B | 1/2011 |
| EP | 1 418 713 | 5/2004 |
| EP | 1418713 A | 5/2004 |
| TW | 588533 | 5/2004 |
| TW | 588533 B | 5/2004 |
| WO | 02/52872 | 7/2002 |
| WO | WO 02052872 A2 | 7/2002 |
| WO | 03/015356 | 2/2003 |
| WO | WO 03015356 A1 | 2/2003 |
| WO | 03/077581 | 9/2003 |

(Continued)

OTHER PUBLICATIONS

Office Action issued in corresponding U.S. Appl. No. 11/610,711, mailed Apr. 2, 2009.

(Continued)

*Primary Examiner* — Tony Mahmoudi
(74) *Attorney, Agent, or Firm* — Brinks Hofer Gilson & Lione (57) ABSTRACT

The present invention provides methods for transmitting SyncML synchronization data. One is that the originator constructs a SyncML message after encrypting the user data to be transmitted and then transmits the data in an existing transmission way; the user data includes, but is not confined to, authentication information, terminal capability information and the data to be synchronized; the other method is that the originator encrypts the SyncML message in the transport layer before transmitting the message, and the recipient deciphers the received SyncML message from transport layer and processes the message subsequently. The two methods can be used either separately or together. If they are used together, the transmission of SyncML synchronization data is provided with double safety insurance. By using the present invention, user data can be transmitted safely without being intercepted by the third party.

9 Claims, 3 Drawing Sheets

FOREIGN PATENT DOCUMENTS

| WO | WO 03077581 A1 | 9/2003 |
|---|---|---|
| WO | 2004/038546 | 5/2004 |
| WO | WO 2004038546 A2 | 5/2004 |
| WO | 2004/070568 | 8/2004 |
| WO | WO 2004070568 A2 | 8/2004 |

OTHER PUBLICATIONS

Office Action issued in corresponding U.S. Appl. No. 11/610,711, mailed Jan. 22, 2010.

Office Action issued in corresponding U.S. Appl. No. 11/610,711, mailed Jul. 21, 2010.

Office Action issued in corresponding U.S. Appl. No. 11/610,711, mailed Dec. 30, 2010.

Office Action issued in corresponding Chinese Patent Application No. 2004100801909, mailed Jun. 27, 2008.

Office Action issued in corresponding Chinese Patent Application No. 2004100801909, mailed Jun. 28, 2010.

Extended European Search Report issued in corresponding European Patent Application No. 05791857.5, mailed Jun. 21, 2007.

Office Action issued in corresponding European Patent Application No. 05791857.5, mailed Mar. 7, 2008.

Office Action issued in corresponding Japanese Patent Application No. 2007-516947, mailed May 5, 2011.

Written Opinion of the International Searching Authority issued in corresponding PCT Patent Application No. PCT/CN2005/001548, mailed Jan. 19, 2006.

International Search Report issued in corresponding PCT Patent Application No. PCT/CN2005/001548, mailed Jan. 19, 2006.

Open Mobile Alliance, "SyncML Device Management Security" Version 1.1.2, OMA-SyncML-DMSecurity-V1_1_2-20031209-A, Dec. 9, 2003. XP-002406302.

SyncML, "SyncML Representation Protocol" version 1.1, Feb. 15, 2002. XP-002381619.

SyncML, "SyncML Sync Protocol" version 1.1, Feb. 15, 2002.

Open Mobile Alliance, "Enabler Release Definition for Data Synchronization" Candidate Version 1.2, OMA-ERELD-SyncML-DS-V1_2-20040601-C, Jun. 1, 2004.

Open Mobile Alliance, "Email Data Object Specification" Candidate Version 1.2, OMA-SyncML-DataObjEmail-V1_2-20040601-C, Jun. 1, 2004.

Open Mobile Alliance, "File Data Object Specification" Candidate Version 1.2, OMA-DS-DataObjFile-V1_2-20040601, Jun. 1, 2004.

Open Mobile Alliance, "Folder Data Object Specification" Candidate Version 1.2, OMA-DS-DataObjFolder-V1_2-20040601-C, Jun. 1, 2004.

Open Mobile Alliance, "SyncML Data Sync Protocol" Candidate Version 1.2, OMA-SyncML-DataSyncProtocol-V1_2-200400601-C, Jun. 1, 2004.

Open Mobile Alliance, "SyncML Representation Protocol, Data Synchronization Usage" Candidate Version 1.2, OMA-SyncML-DataSyncRep-V1_2-20040601-C, Jun. 6, 2004.

Open Mobile Alliance, "SyncML Device Information" Candidate Version 1.2, OMA-SyncML-DevInfo-V1_2-200400601-C, Jun. 1, 2004.

Open Mobile Alliance, Data Synchronization, OMA-TS-SyncML-w5AppChar-v1_2-20040601, Jan. 9, 2004.

Office Action issued in corresponding Chinese Patent Application No. 200410080190.9; dated Jun. 27, 2008 and English translation thereof; total 15 pages.

Office Action issued in corresponding Chinese Patent Application No. 200410080190.9; dated Jun. 28, 2010 and English translation thereof; total 8pages.

Office Action issued in corresponding European Patent Application No. 05791857.5 dated Mar. 7, 2008; total 10 pages.

Office Action issued in corresponding Japanese Patent Application No. 2007516947, dated May 11, 2010; and English Translation thereof; Total 8 pages.

Written Opinion issued in corresponding PCT Application No. PCT/CN2005/001548; dated Jan. 19, 2006; total 3 pages.

International Search Report for International Application No. PCT/CN2005/001548; mailed Jan. 19, 2006.

Jie et al., "Research on Application of PKI Technology in Security Network Information Transmission," pp. 1-8 (2008).

Qihong et al., "Analysis on the SyncML: Synchronization Protocol," pp. 1-9 (2008).

"SyncML Device Management Security, Version 1.12" Open Mobile Alliance OMA-SyncML-DMSecurity-V1_1_1-2-20031209-A (2003).

"SyncML Representation Protocol, version 1.1" available at: http://www.syncml.org/doc/.syncml_represent v11_20020215.pdf.

METHOD FOR TRANSMITTING SYNCML SYNCHRONIZATION DATA

CROSS-REFERENCES TO RELATED APPLICATIONS

This application is a continuation of U.S. patent application No. Ser. 11/610,711, filed on Dec. 14, 2006, which is a continuation of International Application No. PCT/CN2005/001548, filed on Sep. 23, 2005. The International Application claims priority to Chinese Patent Application No. 200410080190.9, filed on Sep. 24, 2004. The afore-mentioned patent applications are hereby incorporated by reference in their entireties.

FIELD OF THE TECHNOLOGY

The present invention relates to Synchronization Markup Language (SyncML) Data Synchronization techniques, more particularly to a method for transmitting SyncML synchronization data.

BACKGROUND OF THE INVENTION

In order to constitute standard specifications for implementing personal information and enterprise data synchronization among multiple platforms and networks, many companies like IBM, Nokia, Palm, Psion, etc., created an industry organization, SyncML iniative, in February 2002. The object of developing the SyncML is to make terminal users, device developers, fundamental component developers, data providers, application software providers and service providers to cooperate together and to make it possible to use any terminal device to visit any network data at any time and any place. A typical application of a SyncML data synchronization is the data synchronization between a network Server and a mobile device or an application Server. Besides, SyncML can also be used for an equivalent data synchronization, e.g. between two PCs.

Clients and Servers mentioned herein all support the SyncML technique, so all the SyncML Clients and SyncML Servers are shortened as Clients and Servers thereafter.

Figure 1:
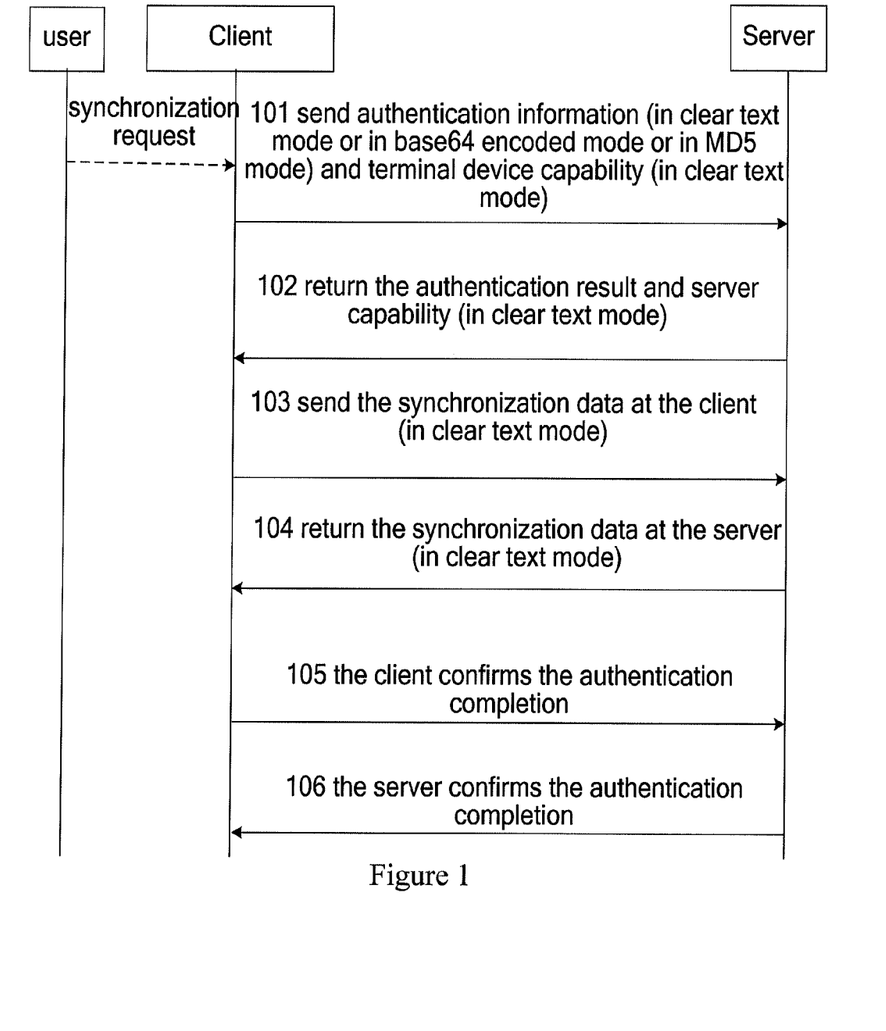
FIG. 1 is a schematic diagram illustrating a procedure of transmitting SyncML synchronization data in the related art.

FIG. 1 is a schematic diagram illustrating a procedure of transmitting the SyncML synchronization data in the related art.

Step 101~step 102: the Client initiates a synchronization initialization request to the Server, requesting an authentication by the Server; the synchronization initialization request usually contains authentication information and device capability information of its own, wherein the authentication information usually contains a user name and a password; the Server executes the initialization operation after receiving the authentication request, and returns an authentication result as well as device capability information of the Server, then the Client executes the initialization operation according to the device capability information of the Server. The initialization is thus finished. The above-described initialization comprises operations of authenticating the user information, designating database(s) to be synchronized, etc.

Of course, if the synchronization initialization request sent to the Server by the Client does not include the authentication information or the device capability information, the Server may request the Client to transmit the required information again.

The above steps constitute the initialization phase of the whole synchronization session by mutual authentication and negotiate the device capabilities of both sides, e.g. supported synchronization types, databases, etc., and to negotiate the database(s) to be synchronized.

Step 103~step 104: the Client sends a synchronization package to the Server, which includes the data to be synchronized. The Server synchronizes the data after receiving the synchronization package and then sends another synchronization package to the Client, which includes a response and the data of the Server to be synchronized.

The Client synchronizes the data after receiving the synchronization package from the Server; if there is still unprocessed data to be synchronized afterward, step 103 and step 104 are repeatedly executed until all data to be synchronized is processed.

The above-described steps constitute the synchronization phase of the whole synchronization session by exchanging synchronization package between the Client and the Server.

Step 105~step 106: the Client sends to the Server a synchronization completion request, and the Server returns an acknowledgement to confirm that the synchronization session is finished successfully.

Thus it is not difficult to see that, the existing method for transmitting the SyncML synchronization data has the following disadvantages:

1) The method that the Client sends the authentication information is unsafe, a third party can easily intercept it. The reason is: if transmitted in clear text, the information can be obtained immediately after being intercepted; if transmitted in the BASE64 encoded mode, the information can be easily decrypted after being intercepted; and it is similar with the MD5 mode (It was proved that the attacker could find MD5-collisions to make the MD5 unsafe in the International Cryptology Conference held in August 2004 in California, US), therefore, the transmission is not very safe even if the MD5 mode is adopted.
2) There is no protection on the user's most important private data, i.e. the data to be synchronized.
3) There is no protection on the data in the transport layer.

SUMMARY OF THE INVENTION

A method for transmitting SyncML synchronization data includes:
a Data Sync Client and a Data Sync Server respectively acquiring a session key and initialization operations being performed therebetween;
the Data Sync Server receiving data to be synchronized from the Data Sync Client encrypted by the session key, decrypting the synchronization data by the acquired session key and performing synchronization operations, encrypting the data to be synchronized of itself with the session key and transmitting the encrypted data to the Data Sync Client;
the Data Sync Client receiving the data to be synchronized from the Data Sync Server, decrypting the data by the session key and performing synchronization operations;
the Data Sync Client sending a synchronization completion request to the Data Sync Server;
ending the current procedure after the Data Sync Client receiving a synchronization completion acknowledgement.

Another method for transmitting SyncML synchronization data includes:
an originator constituting a SyncML message to be sent, encapsulating the SyncML message into a request of a transport layer protocol, and encrypting the encapsulated SyncML message by a secure transport protocol, sending to a recipient;

the recipient decrypting the received request by the secure transport protocol, and transforming the decrypted request into a SyncML message to get the original request after receiving the request, and then executing subsequent operations.

Preferably, the originator is a Data Sync Client and the recipient is a Data Sync Server; or the originator is the Data Sync Server and the recipient is the Data Sync Client.

Preferably, the transport layer protocol is HTTP or WSP or OBEX.

Preferably, if the Data Sync Client is a mobile terminal, then the adopted secure transport protocol is Wireless Transport Layer Security (WTLS) protocol, if the Data Sync Client is a fixed terminal, then the adopted secure transport protocol is Secure Sockets Layer (SSL) protocol or Transport Layer Security (TLS) protocol.

A third method for transmitting SyncML synchronization data includes:

a Data Sync Client acquiring a first session key and a Data Sync Server acquiring a second session key;

encrypting data to be synchronized of the Data Sync Client via the first session key by the client, transmitting the encrypted data to the Data Sync Server;

upon receiving the encrypted data by the server, decrypting the data via the second session key and performing synchronization operations;

encrypting data to be synchronized of Data Sync Server via the second session key by the server, transmitting the encrypting data to the Data Sync Client; and upon receiving the encrypted data by the Data Sync Client, decrypting the data via the first session key and performing synchronization operations.

A fourth method for transmitting SyncML synchronization data includes:

encapsulating a SyncML message into a transport layer protocol request by an originator, encrypting the request via a secure transport protocol and sending the request; and upon receiving the request by a recipient, decrypting the request via the secure transport protocol and transforming the decrypting request into the SyncML message.

DETAILED DESCRIPTION OF THE PREFERRED EMBODIMENTS

The present invention will be described hereinafter with reference to the accompanying drawings.

The present invention mainly provides two transmission methods, one is that an originator encrypts user data to be synchronized and constructs a SyncML message, then transmits the data as in the related art; the user data includes, but are not confined to, authentication information, device capability information and the data to be synchronized; the other is that originator encrypts the SyncML message to be transmitted in transport layer before transmitting it, and a recipient decrypts the received transport layer SyncML message before subsequent processes.

The first method, in which the originator encrypts the data to be synchronized before constructing a SyncML message and then transmits the data as in the related art, will be illustrated hereinafter.

Figure 2:
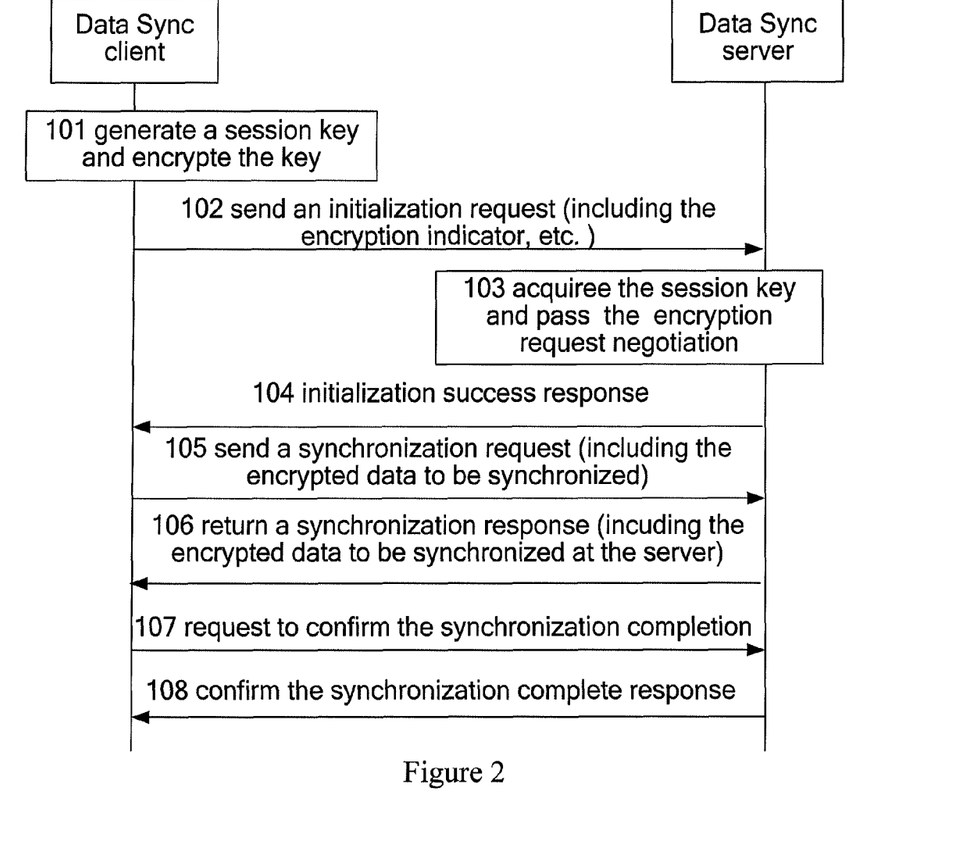
FIG. 2 is a schematic diagram of an embodiment of the present invention illustrating the procedure of transmitting the SyncML synchronization data.

FIG. 2 is a schematic diagram of an embodiment of the present invention illustrating the procedure of transmitting the SyncML synchronization data. In the present embodiment, the Data Sync Server requests that the user data from the Data Sync Client to be encrypted and the Data Sync Client has pre-installed or downloaded the certificate of the Data Sync Server from the network; the certificate contains a public key, the public key therein is used for encryption by the Data Sync Client and the private key is used for decryption by the Data Sync Server; hereby, the Data Sync Server considers the requesting Data Sync Client is reliable and will not require the certificate of the Data Sync Client.

Step 201: after confirming that the certificate of the Data Sync Server is installed and the certificate is still within the effective period, the Data Sync Client generates the session key for encrypting the user data, therein the user data includes the initialization data and the data to be synchronized; after that, the Data Sync Client encrypts the generated session key by the public key of the certificate, then encrypts the initialization data to be transmitted by the generated session key, therein the initialization data includes the authentication information and the device information of the Data Sync Client, etc., wherein, the authentication information includes the user name and the password.

In the present embodiment, the above-mentioned session key generated by the Data Sync Client itself for encrypting the user data is the symmetric key, and its encryption algorithm can be the Advanced Encryption Standard (AES) encryption algorithm, the encryption algorithm based on RC4, or other symmetric encryption algorithms, and the key length is of 96 bits. Of course, in practical applications, the algorithm of the session key is not confined to those above-mentioned, any existing encryption algorithms can be used here as well.

Of course, the session key can also be an asymmetric one, just that the data should be encrypted by the corresponding asymmetric encryption algorithm; in addition, the session key can also be sent to the Data Sync Server directly without being encrypted at all, but that kind of session key may be easily intercepted by the third party with poor safety.

Step 202: the Data Sync Client sends the synchronization initialization request to the Data Sync Server, wherein the request includes an encryption indicator, the session key encrypted by the public key of the Data Sync Server's certificate and the initialization data encrypted by the session key. The above-mentioned encryption indicator is carried in the synchronization initialization request and indicates the algorithm and key length according to the session key.

Step 203: the Data Sync Server receives the synchronization initialization request from the Data Sync Client. If the encryption indicator is detected, the Data Sync Server determines whether it supports the session key according to the configuration of itself, i.e. whether it supports the algorithm and key length according to the session key, if yes, the Data Sync Server decrypts the encrypted session key by its own private key, obtains and stores the decrypted session key, and turns to step 204; otherwise, it returns the synchronization initialization response with the failure reason to the Data Sync Client and requires the Data Sync Client to re-initialize. This failure reason indicates that the Data Sync Server does not support the algorithm, or key length, or session key, meanwhile, this failure reason may further indicate the algorithm and/or key length required by the Data Sync Server.

In this step, if the Data Sync Server detects that there is no encryption indicator in the synchronization initialization request from the Data Sync Client, it will directly return a synchronization initialization response with failure reason to the Data Sync Client, wherein the failure reason is that the Data Sync Client has not sent an encryption indicator while the Data Sync Server requests encryption, and the response may further include the algorithm and/or key length supported by the Data Sync Server.

If the Data Sync Client receives the failure response to the synchronization initialization request, it determines whether it can satisfy the conditions required in the failure reason. If it satisfies, the Data Sync Client will resend a synchronization initialization request to the Data Sync Server, which includes the corresponding conditions required in the failure reason; otherwise, the Data Sync Client stops sending any synchronization initialization request to the Data Sync Server and ends the current session.

Step 204: the Data Sync Server continues to perform the initialization operations, which means that the Data Sync Server decrypts the initialization data from the Data Sync Client by the received session key and continues with subsequent operations using the decrypted data; after that, the Data Sync Server returns a success response to the Client, which includes information that the Data Sync Server has successfully received the session key and its device capability information encrypted by the session key.

After receiving the above-mentioned success response to the synchronization initialization request, the Data Sync Client decrypts the device capability information of the Data Sync Server by the session key generated by itself and then continues with the initialization operations according to the device capability information of the Data Sync Server.

The synchronization initialization phase is finished when the Data Sync Server and the Data Sync Client have executed all the initialization operations.

Step 205: the Data Sync Client encrypts the data to be synchronized using the session key generated by itself and then sends a synchronization request to the Data Sync Server, wherein the request includes the encrypted data to be synchronized.

Step 206: after receiving the request in step 205, the Data Sync Server firstly decrypts the data to be synchronized using the session key before synchronization operations, and then sends a synchronization response to the Data Sync Client, which includes the Data Sync Server's data to be synchronized encrypted by the session key.

After receiving the response in step 206, the Data Sync Client also firstly decrypts the data to be synchronized using the session key before the synchronization operations, if there is still more data to be synchronized, the synchronization phase will not be ended until all data is processed. If there is no data to be synchronized, step 207 will be executed to start the synchronization completion phase.

Step 205~206 may further include integrity verification operations, i.e., the data to be synchronized encrypted by session key and sent to the Data Sync Server by the Data Sync Client can further include the checksum calculated according to the data to be synchronized; this checksum can be calculated either according to the unencrypted data to be synchronized or according to the encrypted data to be synchronized; after the Data Sync Server receives the synchronization data, step 205~206 further includes the process of: calculating the checksum according to the received data to be synchronized and determining whether the calculated checksum is completely the same as the checksum from the Data Sync Client, if yes, continuing with the subsequent operations, otherwise, discarding the received data and ending the current operation and continuing with the subsequent operations. Accordingly, the Data Sync Client can also verify the integrity of the data to be synchronized from the Data Sync Server, so as to avoid interpolation by the third party and further guarantee the security.

Step 207~step 208: the Data Sync Client sends the synchronization completion request to the Data Sync Server, and the Data Sync Server returns the synchronization completion acknowledgement to the Data Sync Client after confirming the completion.

By now, the SyncML synchronization data transmission is finished. The SyncML synchronization data between the Data Sync Client and the Data Sync Server is transmitted under the support of HTTP, OBEX or WSP or other protocols, and the transmission in transport layer is the same as that of the related art.

As to the embodiment shown in FIG. 2, it is feasible to only encrypt the data to be synchronized using the session key while not encrypt the initialization data. Hereby, in step 202, the synchronization initialization request sent to the Data Sync Server by the Data Sync Client includes the encryption indicator, the session key encrypted by the public key of the Data Sync Server's certificate and the decrypted initialization data. After receiving the synchronization initialization request from the Data Sync Client and having determined that the session key and key length are supported, the Data Sync Server will directly execute the initialization operations; after that, it sends a synchronization initialization response to the Data Sync Client, which includes the information about the Data Sync Server's successfully receiving the session key; accordingly, after receiving the above response, the Data Sync Client executes the initialization operations according to the Data Sync Server's device capability information. In other words, the encryption process upon the initialization data, i.e. the authentication data and the device capability information data, is optional.

In addition, the session key negotiation procedure can be either online negotiation or offline negotiation, it is not specified herein. Furthermore, it can also be the Data Sync Server who generates the session key and sends it to the Data Sync Client (this mode may be seldom used), i.e. one of the SyncML Data Sync Server and the SyncML Data Sync Client generates the session key, and transports the key to the other one by way of offline or online negotiation.

In the same way, whether the initialization data is encrypted, the integrity verification operation can be performed upon the initialization data. The procedure is: the initialization data sent to the SyncML Data Sync Server by the Data Sync Client further includes the checksum of the initialization data; after receiving the initialization data, the Data Sync Server calculates the checksum according to the received initialization data and determines whether the calculated checksum is completely the same as the checksum from the Data Sync Client, if yes, continues with the subsequent operations, otherwise, discards this received data and ends the current operation. Under the situation when the initialization data is not encrypted, the above checksum is calculated according to the unencrypted initialization data; when the initialization data is encrypted, the above checksum can be calculated according to either the unencrypted initialization data or the encrypted initialization data.

As to the embodiment shown in FIG. 2, the Data Sync Client can directly send a message to the Data Sync Server to request the Data Sync Server's certificate before sending synchronization initialization request, instead of pre-installing or downloading the Data Sync Server's certificate. Of course, the Data Sync Server can consider the Data Sync Client unreliable and request for the Data Sync Client's certificate. Both the Data Sync Server's certificate and Data Sync Client's certificate have effective periods, therein once the effective period expires, the certificate becomes invalid automatically, the Data Sync Client/Data Sync Server needs to reconfigure the certificate, so its safety is further guaranteed.

The session key in the embodiment shown in FIG. 2 can be a symmetric key with any type of symmetric algorithms, or be an asymmetric key with any type of asymmetric algorithms. If it is an asymmetric one, the session key should be constituted by two pairs of asymmetric keys, therein one pair is generated by the Data Sync Server and the private key is stored by the Data Sync Server while the public key is publicized to the Data Sync Client; the other pair is generated by the Data Sync Client and the private key is stored by the Data Sync Client while the public key is publicized to the Data Sync Server. Because the synchronization is bi-directional, which means the public key is only used for encryption while the private key only for decrypting, there must be two pairs to encrypt/decrypt the data transmitted between the Data Sync Client and the Data Sync Server.

In the above-described embodiment, the Data Sync Client requests to encrypt the user data while the Data Sync Server requires encrypting the user data from the Data Sync Client. If the Data Sync Client requests to encrypt the user data while the Data Sync Server does not support encryption, when receiving the request from the Data Sync Client that includes an encryption indicator, the Data Sync Server will return an initialization failure response to the Data Sync Client due to the Data Sync Server requiring a request without encryption indicator; if the Data Sync Client does not request to encrypt the user data while the Data Sync Server requires the user data from the Data Sync Client to be encrypted, when receiving the request from the Data Sync Client without the encryption indicator, the Data Sync Server will return an initialization failure response to the Data Sync Client due to the Data Sync Server requiring a request with encryption indicator; if the Data Sync Client does not request to encrypt the user data and the Data Sync Server does not require the user data from the Data Sync Client to be encrypted either, subsequent operations are completely the same as in the related art and the existing technical solutions will be adopted.

When receiving the synchronization initialization response which contains failure information from the Data Sync Server, the Data Sync Client determines whether it can satisfy the required conditions in the failure reason, if yes, the Data Sync Client resends a synchronization initialization request to the Data Sync Server, which includes the corresponding conditions in the failure reason, otherwise, the Data Sync Client stops sending synchronization initialization request to the Data Sync Server and ends the current procedure.

In the above-described embodiment, the status information in the response sent to the Data Sync Client by the Data Sync Server, i.e. the success or failure status information, can be identified by status codes, and the mapping relations between status codes and the status information can be set according to specific needs in practical applications, which is not restricted herein.

All the messages interacted between the Data Sync Client and the Data Sync Server, such as various requests and responses, are all SyncML messages based on the existing SyncML protocol, and the transmission method in the transport layer is completely the same as that in the related art.

In addition, there is still another situation to be specified: when the Data Sync Client and the Data Sync Server are authenticating each other in the initialization phase, the Data Sync Server can authenticate the Data Sync Client either by an existing authentication method or a HMAC-based method, therein adopting HMAC-based method can make sure the requesting Data Sync Client is legal. For specific applications, HMAC-MD5 or HMAC-SHA1 methods can be adopted for the authentication. Furthermore, when the Data Sync Server adopts the HMAC-based method to authenticate the Data Sync Client, in subsequent procedure of transmitting the data to be synchronized, the data can be either encrypted, or be unencrypted and transmitted completely the same as the related art.

The method for transmitting the encrypted data in transport layer will be illustrated hereinafter.

Figure 3:
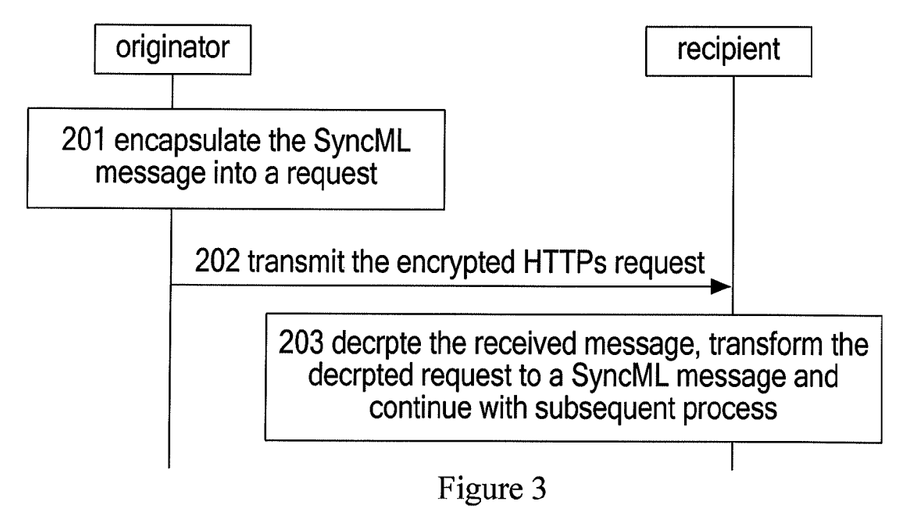
FIG. 3 is a schematic diagram illustrating the procedure of the transport layer operations when transmitting the SyncML synchronization data in the present invention.

FIG. 3 is a schematic diagram illustrating the procedure of transmitting SyncML synchronization data after encrypting in the transport layer in the present invention. In the present embodiment, HTTPs is adopted as the transmission protocol of transport layer.

Step 301: after constructing a SyncML message, the originator transforms the SyncML message to a HTTPs request.

Step 302: the originator encrypts the SyncML request in step 301 by the secure transport protocol and then sends the encrypted HTTPs request to the recipient.

Step 303: after receiving the request in step 302, the recipient decrypts the request by the secure transport protocol and transforms the decrypted HTTPs request to a SyncML message before subsequent operations.

Besides the above illustration based on the example of using HTTP protocol in SyncML transport layer, OBEX, WSP and other protocols are also available in the transport layer. The above-mentioned originator is a Data Sync Client and the recipient is a Data Sync Server, or the originator is a Data Sync Server and the recipient is a Data Sync Client.

If the Data Sync Client is a mobile terminal, i.e. a cell phone, then the adopted secure transport protocol is Wireless transport Layer Security (WTLS); if the Data Sync Client is a fixed terminal, i.e. a PC terminal, then the adopted secure transport protocol is or Secure Sockets Layer (SSL) protocol or Transport Layer Security (TLS) protocol.

The above-mentioned transmission manner of encrypting the transport layer data can be adopted either separately or together with the method of encrypting the data to be transmitted. If they are used together, the transmission of the SyncML synchronization data is provided with double security insurance. In other words, either the transport layer is encrypted or the Application Level (which means SyncML message header or the message body, and the message body may include multiple pieces of data to be synchronized) and Object Level (which means a specific piece of data to be synchronized) are encrypted.

In order to provide double security insurance, both the Data Sync Server and the Data Sync Client must support encryption upon transport layer synchronization and Application Level synchronization; if the Data Sync Client only supports encryption upon Application Level synchronization rather than encryption upon transport layer synchronization, then only the transmitted user data is encrypted, which means the Application Level and the Object Level are encrypted, thus operations like negotiating the key and key length are needed; if the Data Sync Client only supports encryption upon transport layer, then only methods of encrypting the transport layer can be adopted.

The SyncML Data Sync Client in this invention is a mobile terminal or an application Data Sync Server.

While the present invention has been described with reference to the preferable embodiments, it is not confined to the embodiments. It will be understood by those skilled in the field that various changes may be made and equivalents may be substituted without departing from the scope of the present invention.

What is claimed is:

1. A method for transmitting SyncML synchronization data, comprising:
    receiving, by a Data Sync Server device, a synchronization initialization request sent from a Data Sync terminal device;
    determining, by the Data Sync Server device, whether the synchronization initialization request comprises an encryption indicator, and if there is no encryption indicator in the synchronization initialization request, returning a synchronization initialization response comprising a failure reason indicating that encryption is required;
    determining, by the Data Sync Server device, whether the Data Sync Server device supports an algorithm and a key length indicated in the synchronization initialization request, if the Data Sync Server device supports, acquiring a session key in the synchronization initialization request and performing initialization operations, otherwise, returning a synchronization initialization response comprising a failure reason indicating that the Data Sync Server device does not support the algorithm or the key length in the synchronization initialization request;
    receiving, by the Data Sync Server device, synchronization data encrypted by the session key from the Data Sync terminal device, decrypting the synchronization data by the acquired session key and performing synchronization operations;
    encrypting, by the Data Sync Server device, data with the session key to form encrypted synchronization data and transmitting the encrypted synchronization data to the Data Sync terminal device;
    receiving, by the Data Sync Server device, a synchronization completion request sent from the Data Sync terminal device; and
    returning, by the Data Sync Server device, a synchronization completion acknowledgement to the Data Sync terminal device.

2. The method according to claim 1, wherein the synchronization data received by the Data Sync Server device further comprises a checksum calculated according to the synchronization data;
    the method further comprising: after receiving the synchronization data, the Data Sync Server device calculating a checksum by the received synchronization data, determining whether the calculated checksum is same as the checksum in the received synchronization data, if they are the same, continuing with subsequent operations, otherwise, discarding the received synchronization data.

3. The method according to claim 1, wherein the session key is encrypted by a public key and included in the synchronization initialization request;
    after confirming the algorithm and the key length being supported, the Data Sync Server device decrypting the encrypted session key in the synchronization initialization request by a stored private key, to obtain the session key generated by the Data Sync terminal device.

4. The method according to claim 1, wherein the synchronization initialization request further comprises initialization data encrypted by the session key, the initialization operations comprises:
    the Data Sync Server device decrypting the initialization data by the obtained session key, performing initialization operations and sending, to the Data Sync terminal device, a synchronization initialization response comprising success information indicating the Data Sync Server device has successfully received the session key and device capability information of the Data Sync Server device encrypted by the session key.

5. The method according to claim 4, wherein, the initialization data further comprises authentication information comprising user name.

6. The method according to claim 1, wherein, the encryption indicator in the synchronization initialization request sent by the Data Sync terminal device indicates the algorithm and the key length of the session key.

7. A Data Sync Server device, configured to execute a method for transmitting SyncML synchronization data, wherein the device comprises:
    a synchronization initialization receiving unit that receives request sent from a Data Sync terminal device;
    an encryption determining unit that determines whether the synchronization initialization request comprises an encryption indicator, and if there is no encryption indicator in the synchronization initialization request, returns a synchronization initialization response comprising a failure reason indicating that encryption is required;
    a support determining unit that determines whether the Data Sync Server device supports an algorithm and a key length indicated in the synchronization initialization request, if the Data Sync Server device supports, acquires a session key in the synchronization initialization request and performs initialization operations, otherwise, returns a synchronization initialization response comprising a failure reason indicating that the Data Sync Server device does not support the algorithm or the key length in the synchronization initialization request;
    a synchronization data receiving unit that receives synchronization data encrypted by the session key from the Data Sync terminal device, decrypts the synchronization data by the acquired session key and performs synchronization operations;
    a data encrypting unit that encrypts data with the session key to form encrypted synchronization data and transmits the encrypted synchronization data to the Data Sync terminal device;
    a synchronization completion request receiving unit that receives a synchronization completion request sent from the Data Sync terminal device; and
    a synchronization completion returning unit that returns a synchronization completion acknowledgement to the Data Sync terminal device.

8. The Data Sync Server device according to claim 7, wherein the session key is encrypted by a public key and included in the synchronization initialization request; and the Data Sync Server device is further configured to decrypt the encrypted session key in the synchronization initialization request by a stored private key and obtain the session key generated by the Data Sync terminal device.

9. The Data Sync Server device according to claim 7, wherein the synchronization initialization request further comprises initialization data encrypted by the session key, the initialization operations comprises:

the Data Sync Server device decrypting the initialization data by the obtained session key, performing initialization operations and sending, to the Data Sync terminal device, a synchronization initialization response comprising success information indicating the Data Sync Server device has successfully received the session key and device capability information of the Data Sync Server device encrypted by the session key.

* * * * *